(12) United States Patent
Pu et al.

(10) Patent No.: US 8,406,994 B1
(45) Date of Patent: Mar. 26, 2013

(54) ELECTRONICALLY GENERATED REALISTIC-LIKE MAP

(75) Inventors: Kent Qing Pu, San Diego, CA (US); Ivan Angelov, Del Mar, CA (US); David Thieme, San Diego, CA (US)

(73) Assignee: InfoGation Corporation, San Diego, CA (US)

(*) Notice: Subject to any disclaimer, the term of this patent is extended or adjusted under 35 U.S.C. 154(b) by 550 days.

(21) Appl. No.: 12/614,406

(22) Filed: Nov. 7, 2009

Related U.S. Application Data (60) Provisional application No. 61/112,703, filed on Nov. 7, 2008.

(51) Int. Cl.
*G06F 19/00* (2011.01)
(52) U.S. Cl. ........ 701/408; 701/409; 701/410; 701/415; 701/418; 701/423; 701/428; 701/431; 701/436

(58) Field of Classification Search .................. 701/408; 340/995.1, 601; 345/501; 702/3
See application file for complete search history.

(56) References Cited

U.S. PATENT DOCUMENTS

| | | | |
|---|---|---|---|
| 2004/0066316 A1* | 4/2004 | Ogawa | 340/995.1 |
| 2005/0140929 A1* | 6/2005 | Nambudiri et al. | 353/31 |
| 2007/0047809 A1* | 3/2007 | Sasaki | 382/170 |
| 2008/0079591 A1* | 4/2008 | Chow | 340/601 |

* cited by examiner

*Primary Examiner* — Redhwan k Mawari
(74) *Attorney, Agent, or Firm* — Wuxi SinoIP Agency, Ltd.; Joe Zheng (57) ABSTRACT

Improved designs of navigation devices or systems are disclosed. A navigation device presents a digital map resembling an ambient environment with a certain level of realism, where various objects resembling major structures or signs are presented or superimposed in the map. Depending on the time of the day or the weather condition of the time, the map or the objects therein is caused to be altered correspondingly in a tone that reflects the time or weather.

18 Claims, 11 Drawing Sheets

ELECTRONICALLY GENERATED REALISTIC-LIKE MAP

CROSS-REFERENCE TO RELATED APPLICATION

This application claims the benefits of the provisional application, No. 61/112,703, entitled "Electronically Generated Realistic Map", filed Nov. 7, 2008, which is hereby incorporated by reference for all purposes.

BACKGROUND OF THE INVENTION

1. Field of the Invention

The present invention is generally related to the area of Global Positioning System (GPS). In particular, the present invention is related to electronically generated map with one or more objects therein being realistic.

2. Description of Related Art

The Global Positioning System (GPS) is the only fully functional Global Navigatio Satellite System (GNSS). Utilizing a constellation of at least 24 medium Earth orbit satellites that transmit precise microwave signals, the system enables a GPS receiver to determine its location, speed and direction.

A GPS receiver calculates its position by measuring the distance between itself and three or more GPS satellites. Measuring the time delay between transmission and reception of each GPS microwave signal gives the distance to each satellite, since the signal travels at a known speed. The signals also carry information about the locations of the satellites. By determining the position of, and distance to, at least three satellites, the receiver can compute its position using trilateration.

Figure 1:
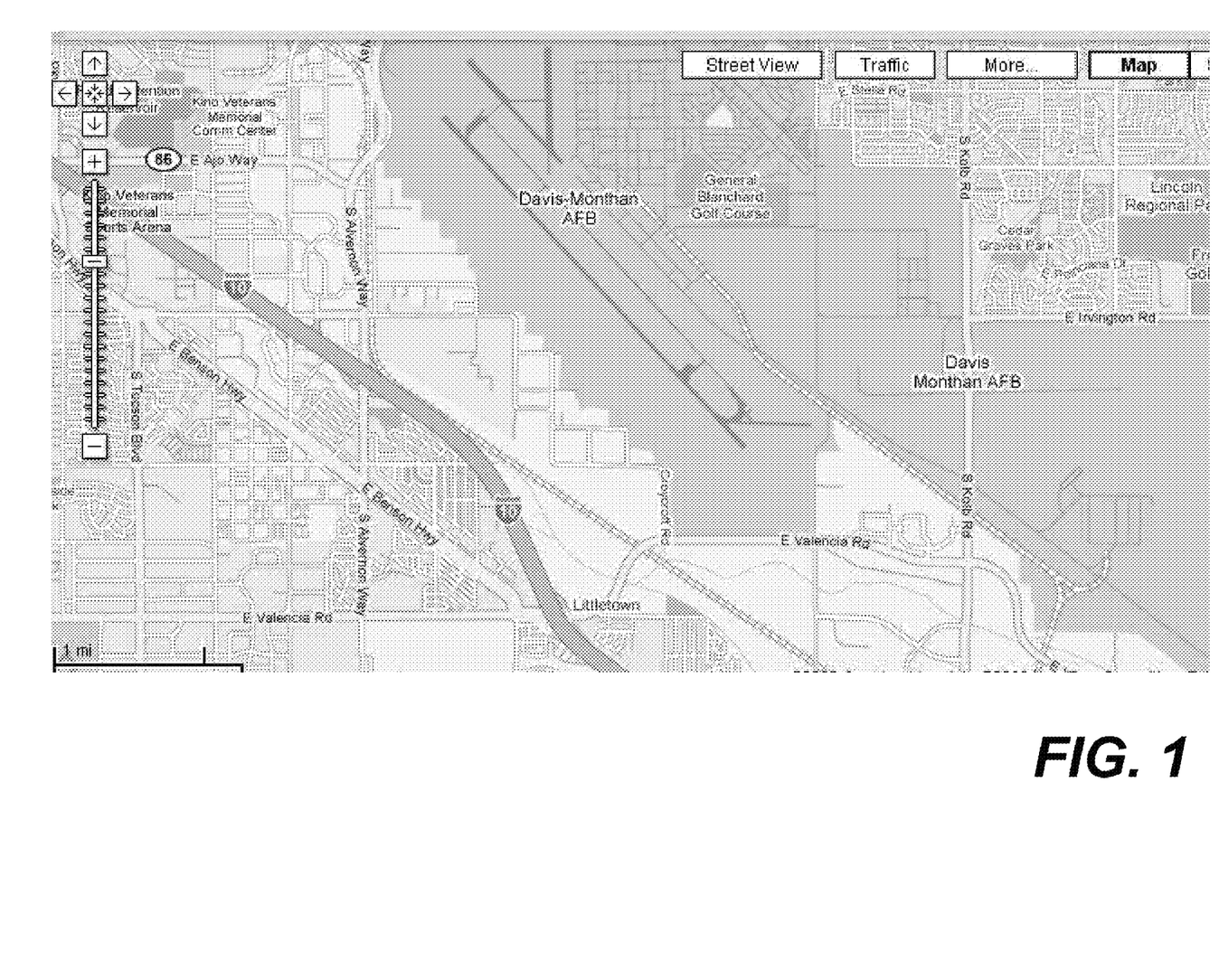
FIG. 1 shows an exemplary map that is electronically and artifically generated.

GPS receivers are being widely used in automobiles and help drivers find where they want to go. A GPS receiver typically presents a map on which a location of the GPS receiver itself is represented. FIG. 1 shows a common electronically generated 2D map. The map style remains the same regardless it is a day time or evening time. Such a display is considered boring. There is a need for techniques that produce an electronically and artificially generated map more adaptable with the surrounding (e.g., time, weather) or individual preference.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

Broadly speaking, the present invention is related to improved designs of navigation devices or systems. According to one aspect of the present invention, a navigation device presents a digital map resembling an ambient environment with a certain level of realism, where various objects resembling major structures or signs are presented or superimposed in the map. Depending on the time of the day or the weather condition of the time, the map or the objects therein is caused to be altered correspondingly in a tone that reflects the time or weather.

The present invention may be implemented as a method, an apparatus or a part of a system. According to one embodiment, the present invention is a method for displaying a map on a GPS receiver, the method comprises: displaying the map in accordance with a location determined by the GPS receiver; superimposing images representing objects onto the map, wherein the objects resembles structures or settings around the location; changing the images with different color effects in reference to an input from at least a source about conditions of the location at a time that the map is to be displayed on the GPS receiver, making the map resembling an electronically generated map with a certain level of realism in accordance with surrounding of the location of the GPS. The structures or settings may include landmarks, signs, significant buildings, exit designs or other impressions resembling the vicinity of the GPS receiver. In a general application, the GPS receiver is carried in a vehicle.

According to another embodiment, the present invention is a GPS device comprising: a memory space for storing code, a micro-controller, coupled to the memory space, executing the code to perform operations of: displaying the map in accordance with a location determined by the GPS device; superimposing images representing objects onto the map, wherein the objects resembles structures or settings around the location; changing the images with different color effects in reference to an input from at least a source about conditions of the location at a time that the map is to be displayed on the GPS device, making the map resembling an electronically generated map with a certain level of realism in accordance with surrounding of the location of the GPS device.

The foregoing and other objects, features and advantages of the invention will become more apparent from the following detailed description of a preferred embodiment, which proceeds with reference to the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 2A:
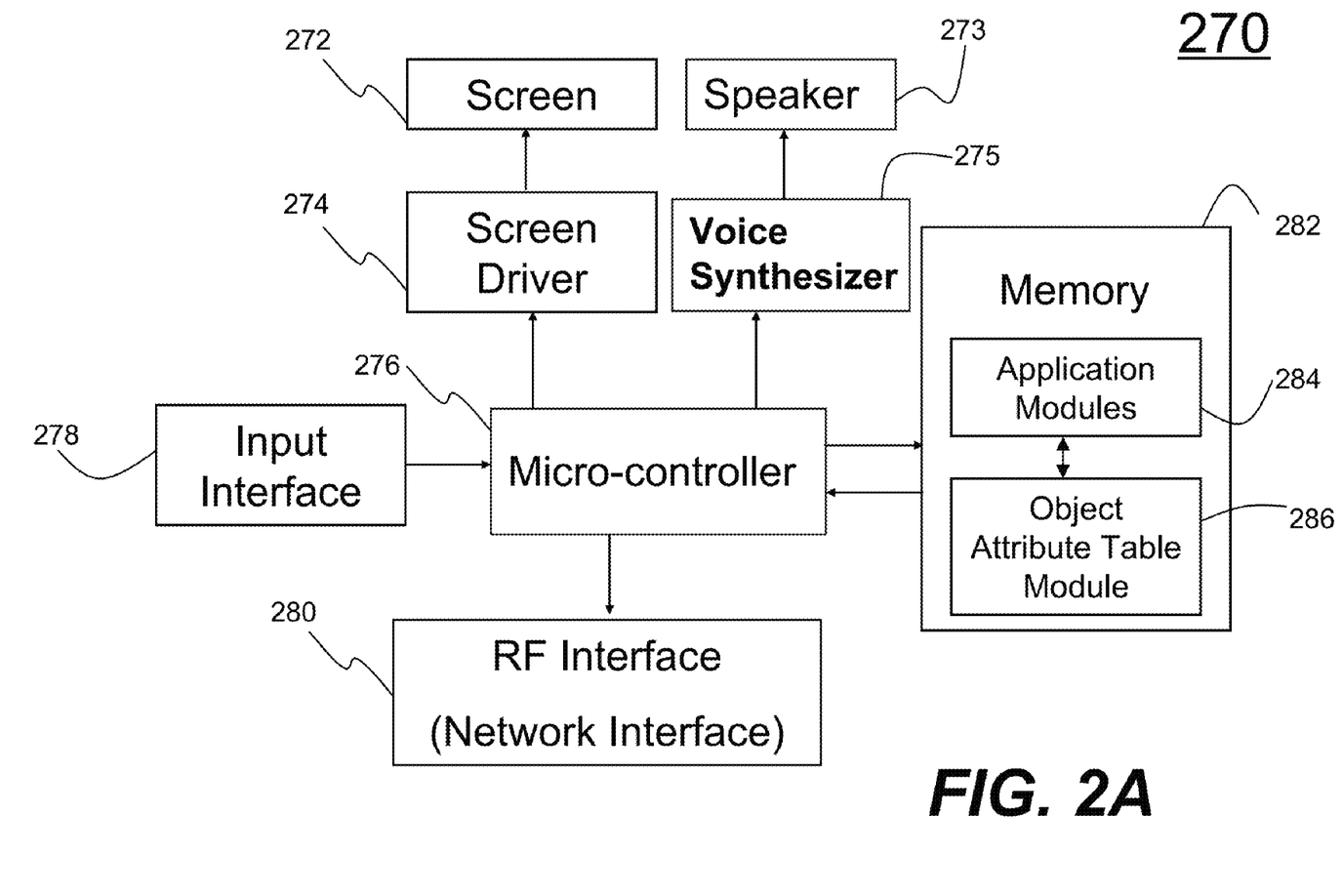
FIG. 2A shows an internal functional block diagram of an exemplary GPS receiver.

Referring now to the drawings, in which like numerals refer to like parts throughout the several views. FIG. 2A shows an internal functional block diagram of an exemplary GPS receiver 270 or a portable device configurable to be a GPS receiver. The GPS receiver 270 equipped with an RF interface 280 for receiving GPS signals has a display screen 272. The display screen 272 may be an LCD screen. The screen 272 communicates with and is commanded by a screen driver 274 that is controlled by a microcontroller (e.g., a processor) 276. A memory unit 282 may be loaded with one or more application modules 284 that can be executed by the microcontroller 276 with or without a user input via a user interface 278 to achieve desired tasks. The memory unit 282 may also contain a map object attribute table module 286. In one embodiment, an application module is configured to generate an electronic map from data received from a service provider or stored locally.

In another embodiment, an application module is configured to process a map object attribute table and cause a resultant map to be more adaptive with the environment in accordance with an input. Depending on implementation, the input may be from a server remotely located, where the server collects data about a particular location of the GPS receiver 270. For example, the GPS receiver 270 is installed in a vehicle. As the vehicle goes on a road, data about the location of the vehicle is periodically or constantly received. The data may be supplied to the application module that is configured to process the map object attribute table and cause a resultant map to reflect the then-condition. In another embodiment, the data is received from a user or one or more onboard sensors (e.g., a raining sensor, a light detector, a temperature sensor, a humidity sensor and a clock).

In operation, the micro-controller 276 calculates the position based on the GPS signal received via the RF interface 280, and executes one of the application modules 284. The screen driver 274 generates control signals to drive screen 272 to display a map and indicates where the GPS receiver 270 is currently located. If the GPS receiver 270 is installed in a vehicle, the map is constantly updated.

In yet another embodiment of the invention, an application module is configured to generate necessary codes for a voice synthesizer 275 coupled to the micro-controller 276 to artificially produce human voices for directing the user to desired destinations. The synthesized voice is transmitted to a speaker 273 in the GPS and broadcasted.

Figure 2B:
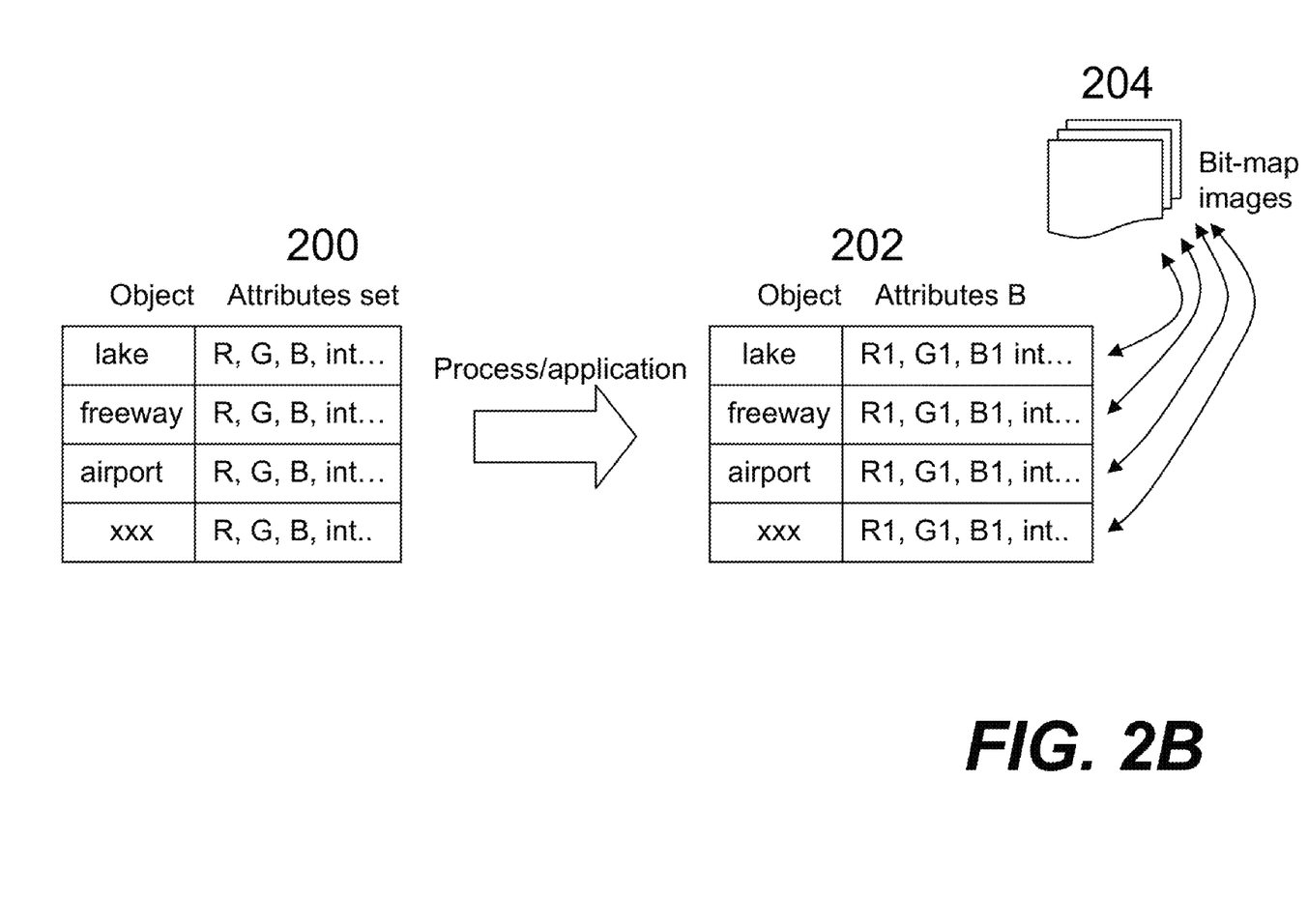
FIG. 2B shows a map attributes table that includes a list of object names and their corresponding attributes.

FIG. 2B shows a map object attribute table 200 that includes a list of object names and their corresponding attributes. For example, an object referred to as a freeway is a common object in an electronic map displayed on a GPS receiver. The attributes determine how the freeway may be displayed in an electronic map. In a prior art GPS receiver, the freeway is typically displayed as a uniformly colored (e.g., gray) line or band; a lake is commonly colored in green; and the sky is commonly painted as blue. Regardless of the time of day, evening or daytime, these colors remain unchanged.

According to one embodiment, an application or process is applied to modify the attributes of one or more of the map objects. Thus, the color, or other components of a map object can be changed according to the user's preference. The attributes may be further expanded to include one or more bit-map images 204. The bit-map images 204 may be a real or an artificially generated picture of a structure. Therefore, a modified map object attribute table 202 containing attributes for generating more realistic view of the map objects is produced.

Figure 3A:
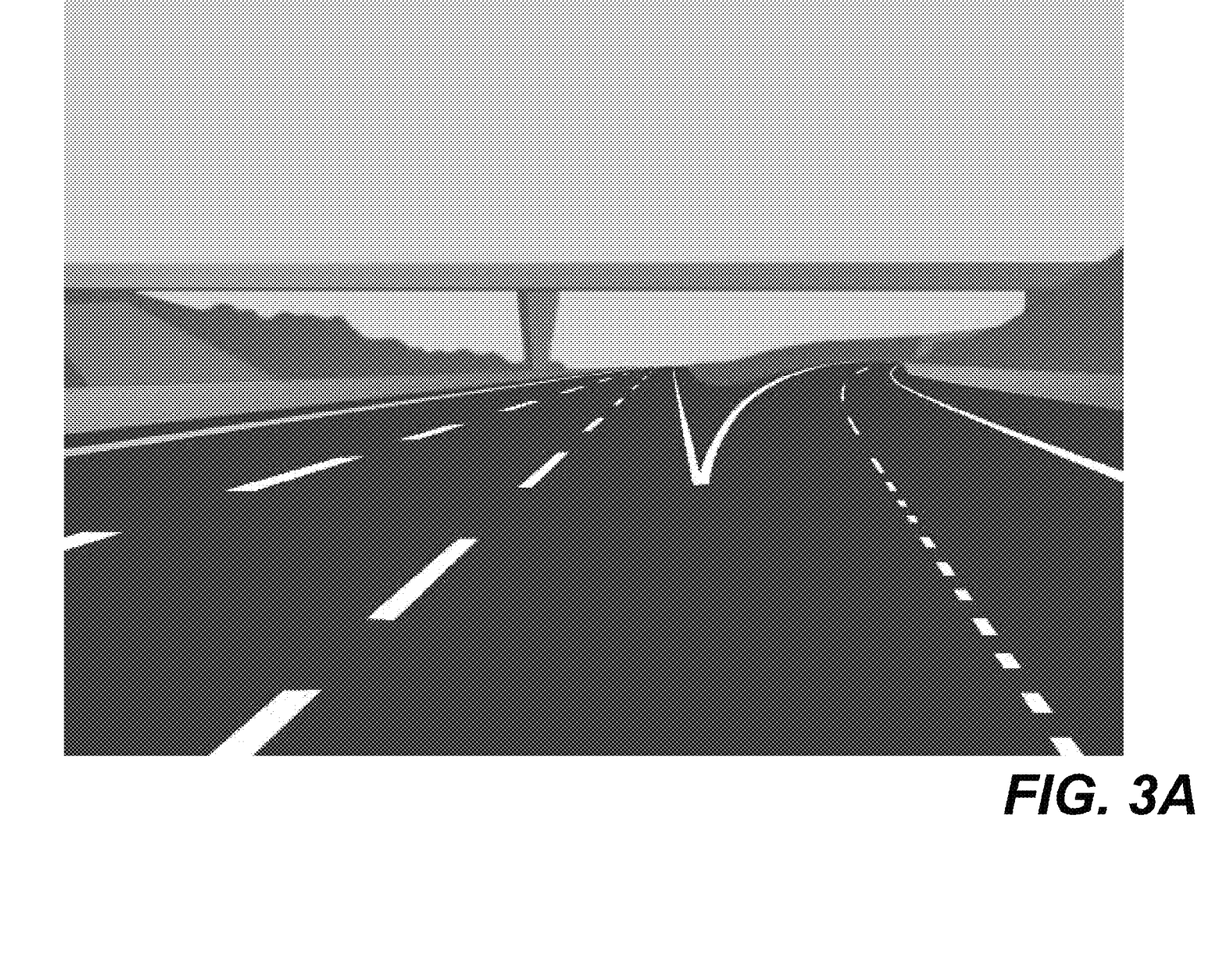
FIG. 3A shows a map simulating a highway exit generated from an embodiment of the present invention with monotonic sky background.

To facilitate the understanding of the present invention, three exemplary 3D maps generated from an embodiment of the present invention are presented hereafter. FIG. 3A shows a 3D map of a highway exit. The color attributes of the sky map object are set to show a turquoise color. In prior art, this sky color can not be changed. In the present invention, however, an application module may be executed, or a user is permitted to make changes, to alter the attributes of any map objects. In one embodiment, the attributes of some or all of the map objects to be displayed at a time may be automatically altered in accordance with a clock, a geographic location, weather or surrounding lighting condition and other ambient parameters.

Figure 3B:
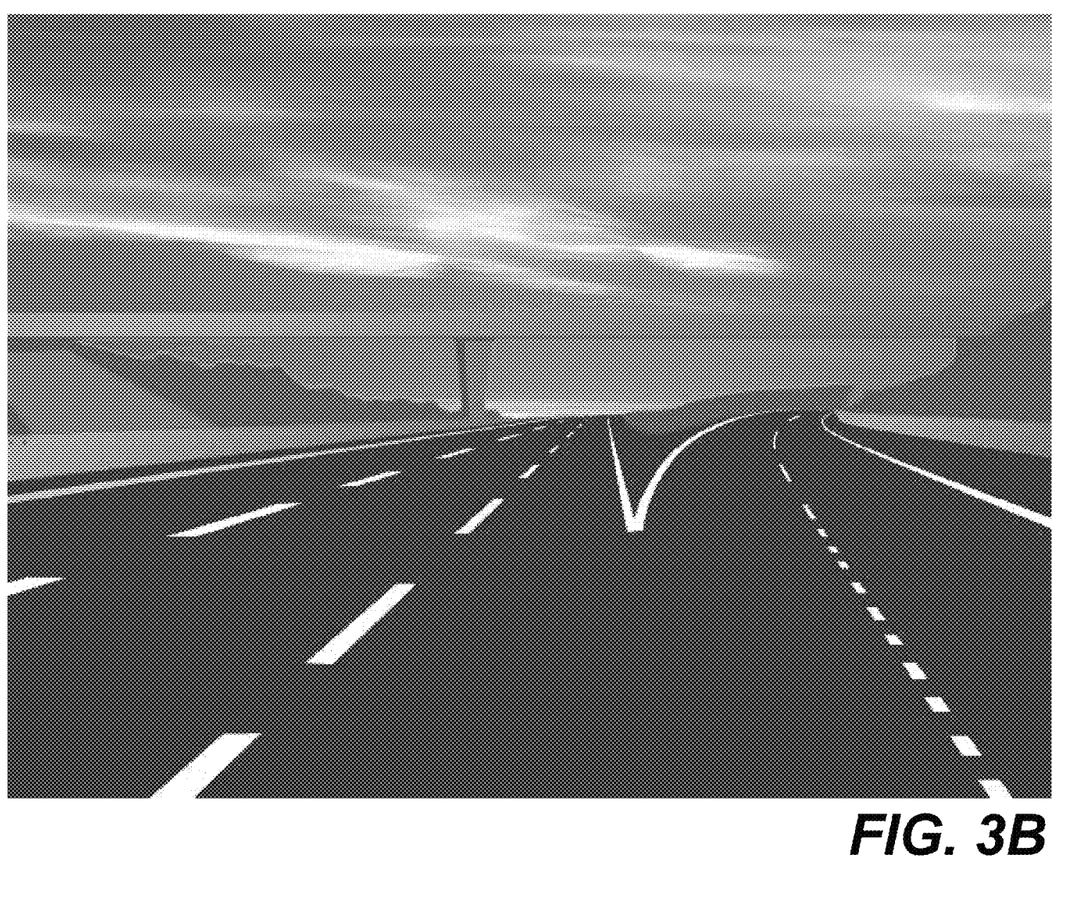
FIG. 3B shows a map resembling a highway exit generated from an embodiment of the present invention with a sunset sky background.
Figure 3C:
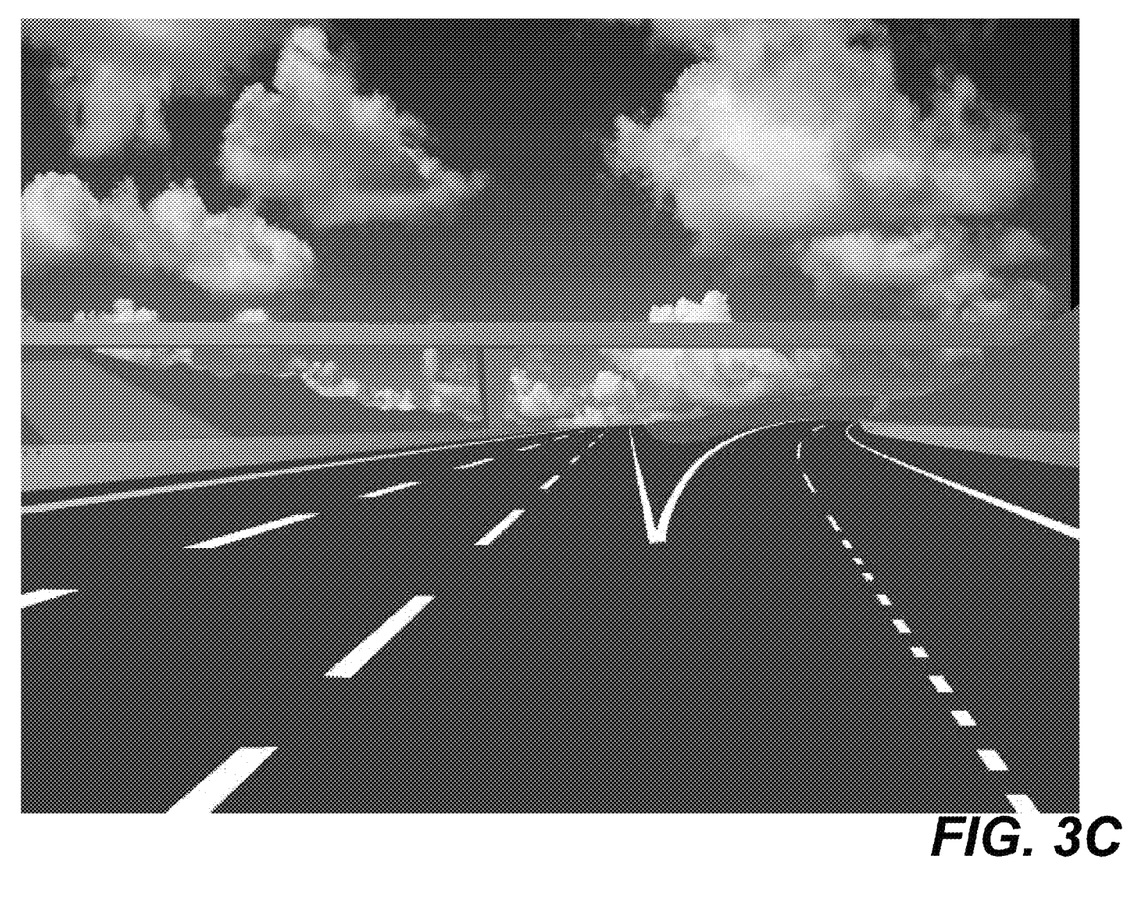
FIG. 3C shows a map resembling a highway exit generated from an embodiment of the present invention with a sunny-day sky background.

FIG. 3B shows a similar map of a highway exit with the sky map object attributes changed to show a more realistic sky at dawn or at sunset. FIG. 3C shows the same map of a highway exit (FIG. 3A) where the sky map object attributes are changed to simulate the sky of a sunny day. The maps in FIG. 3B and FIG. 3C are evidently more realistic and appealing than FIG. 3A.

Figure 4:
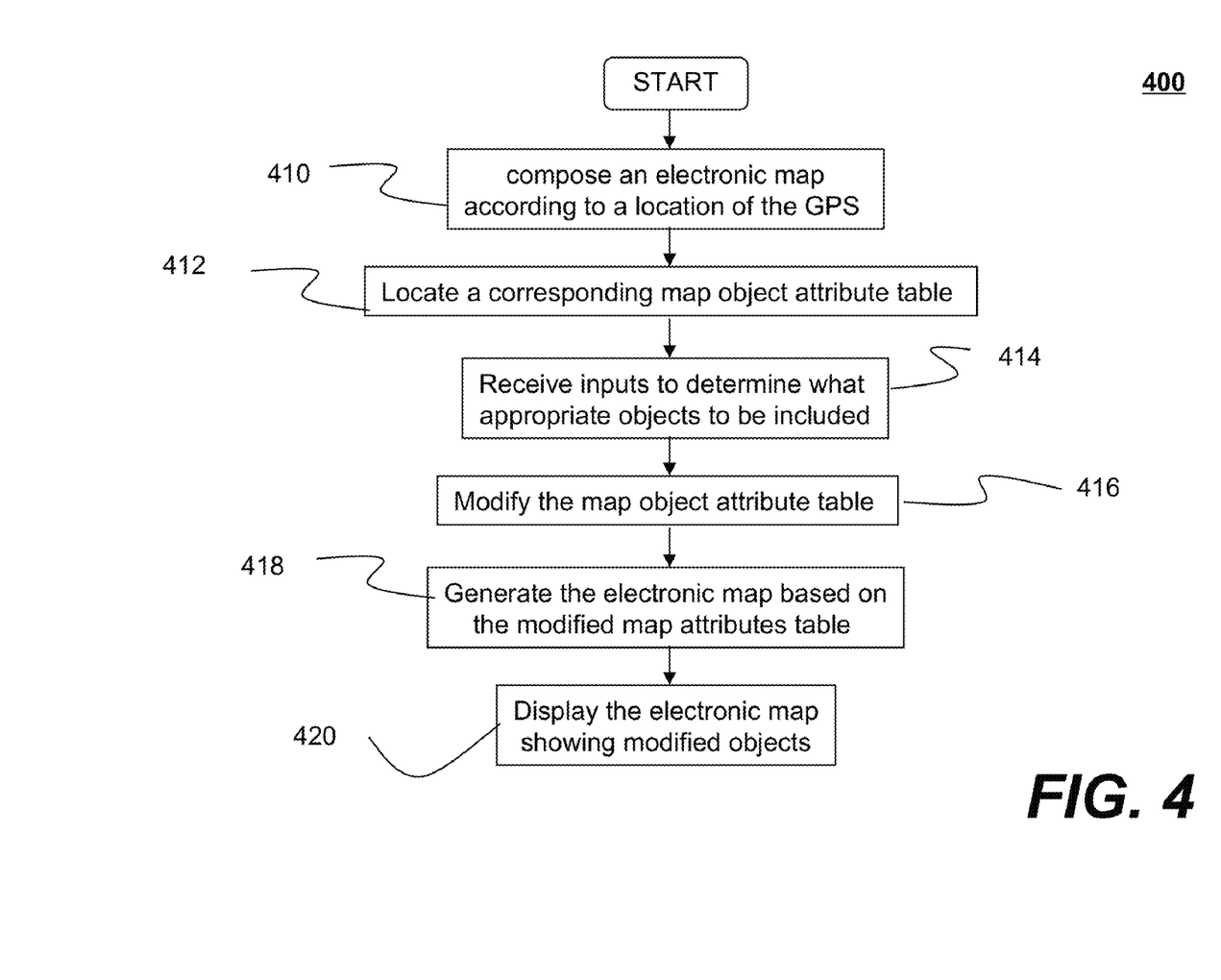
FIG. 4 shows a flowchart or process of electronically generating a map containing realistic or simulated objects.

FIG. 4 shows a flowchart or process 400 of generating such a map with realistic objects according to one embodiment of the present invention. The process 400 may be implemented in software, hardware or a combination of both software and hardware. In one embodiment, the process 400 is implemented in an application module that is executed by a microcontroller in a GPS. To facilitate the description of the process 400, FIG. 2A may be referenced.

The process 400 starts whenever a GPS is ready to generate a realistic map. At 410, a GPS device calculates its location based on the received satellite signals, and constructs an electronic map according to the location of the GPS. After the GPS location is determined, at 412, the micro-controller 276 in the GPS searches and locates the map object attribute table in the memory unit 282 for map objects in the vicinity of the GPS location.

Referring to user inputs, inputs generated from sensors, or other references (e.g., outputs of an application module), the GPS determines what map objects to be displayed and what in the map object attribute table needs to be changed at 414. The map object attribute table is modified at 416 according to the requirement set by step 414. For example, the color attribute(s) of a mountain background may be changed per a request from the user; or a map object of a landmark may be included in the map per results of an application module output (e.g., sunset time or a raining day). As the map objects to be displayed and their respective attribute tables are determined, the GPS generates an electronic map including every map object to be displayed with their respective set attributes at 418. At 420, a final realistic electronically generated map is displayed. It should be noted that inputs that may cause a map to change may include entries directly from a user and data from one or more sensors. In a vehicle, for example, there are many sensors including temperature sensors and a rain sensor. Data from these sensors or an electronic clock may be used to assist the micro-controller to determine an electronic map with desired objects.

Figure 5A:
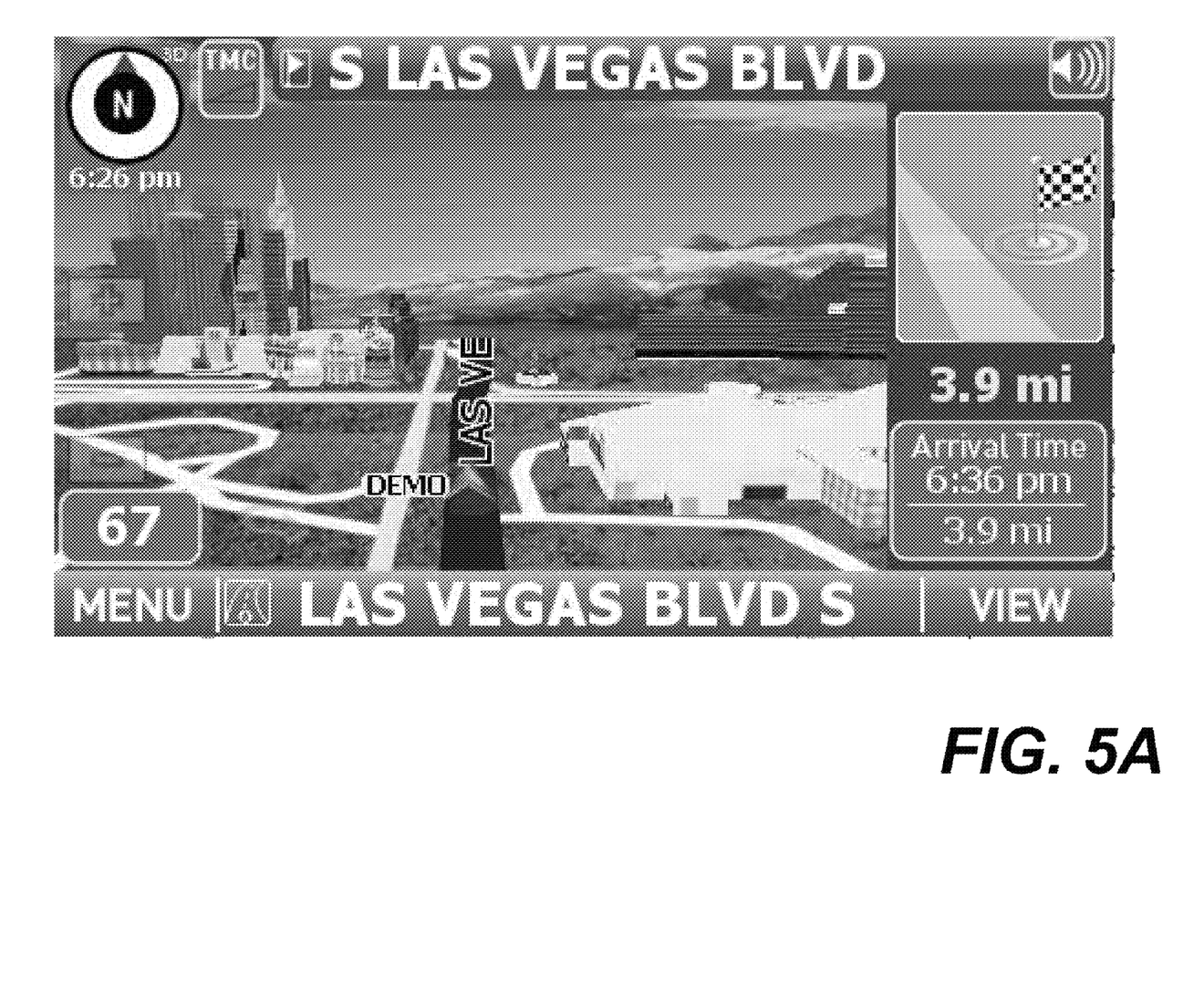
FIG. 5A shows a map displaying landmarks and surrounding structures superimposed onto the street map on a GPS receiver embedded with one embodiment of the present invention.

As an example, FIG. 5A shows a map displayed on a GPS embedded with one embodiment of the present invention. Instead of displaying a street map to show the location of the GPS on the map, cartoon-like surrounding images of some important or famous landmarks or structures (such as bridges, buildings or mountains) are superimposed onto the street map. These images indexed by corresponding names or reference numbers may be automatically added in accordance with the location of the GPS. A mountain is added in the background. Depending on the time of day, an image of a bright, dawn, sunset, raining or evening sky may be displayed together with the mountain.

Figure 5B:
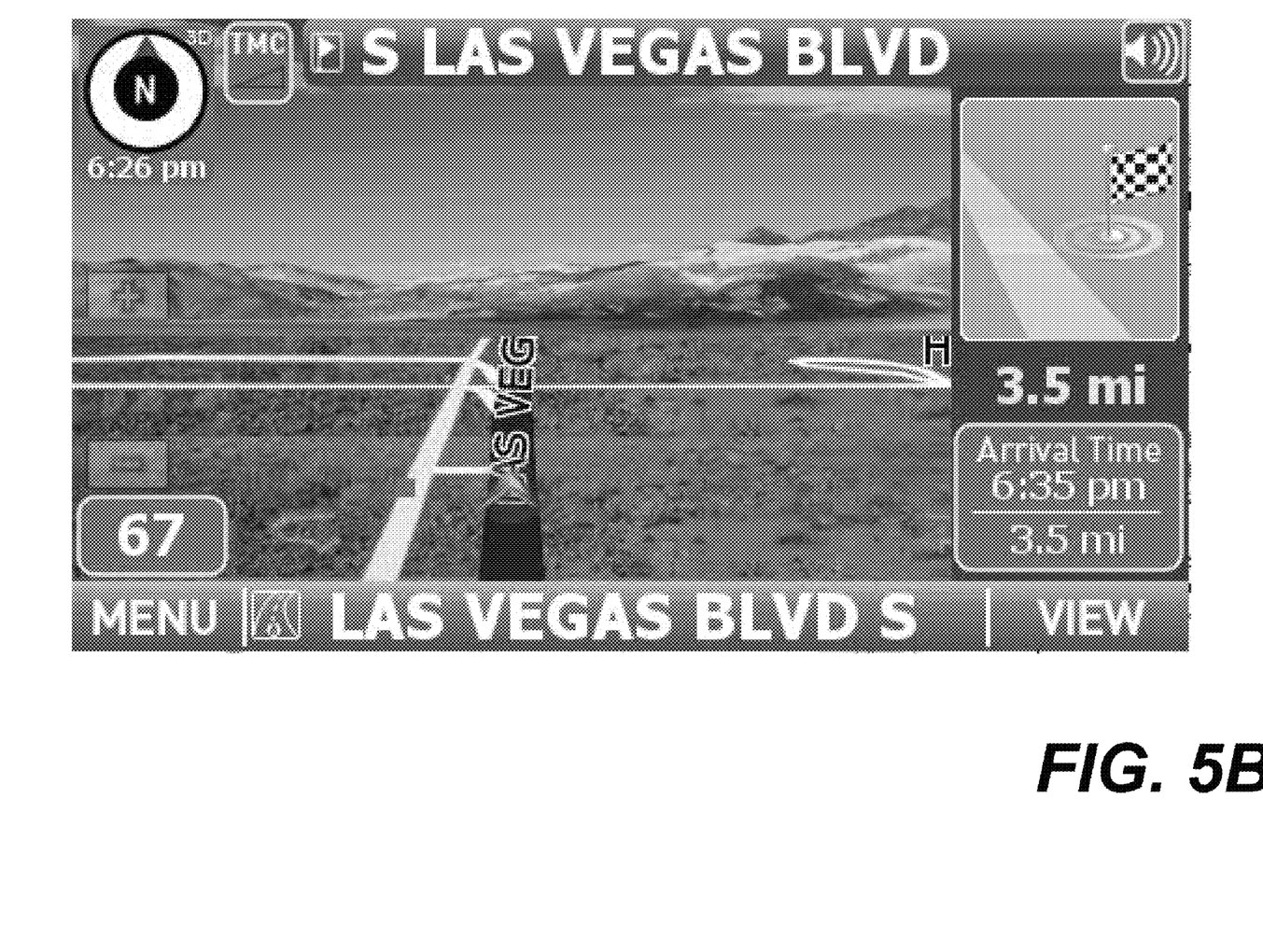
FIG. 5B shows the same map as FIG. 5A with a set of different structures as the location of the GPS has been changed.

FIG. 5B shows the same map as FIG. 5A with a set of different map object structures as the location has been changed. It is shown that the GPS may be positioned in a vehicle going along the Las Vegas Boulevard in Las Vegas. With the change of the landmarks or structures, the sky and the mountain are sill displayed with the map. To avoid being static, the sky or the perspective of the mountain may be altered slightly but dynamically depending on the orientation of the vehicle going along the direct, leaving an impression that a driver of the vehicle is seeing an electronically generated map with certain level of realism.

Figure 6A:
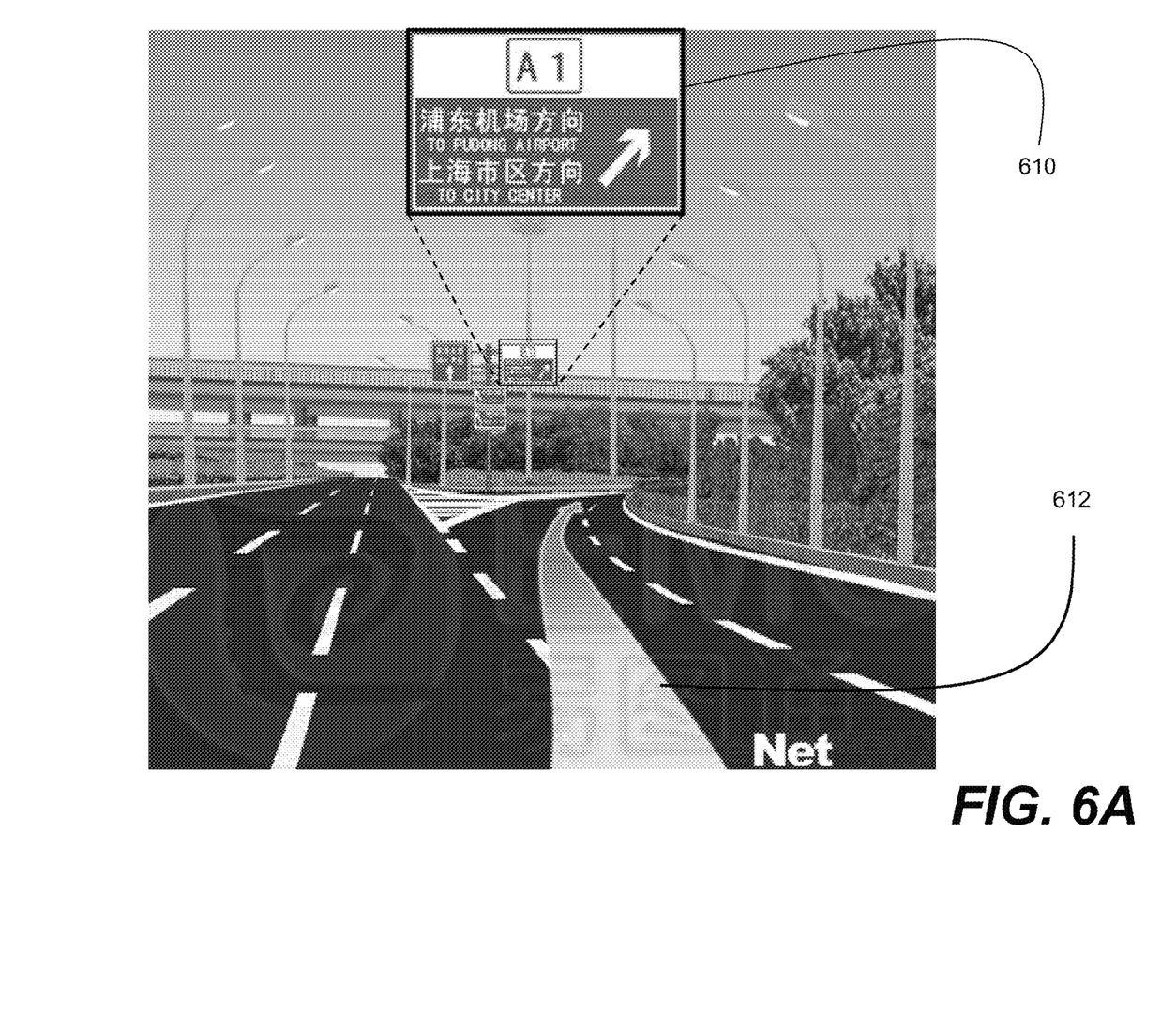
FIG. 6A shows an exemplary implementation of one embodiment of the invention to generate a 3D map displaying an enlarged navigation information (e.g., road sign) at a highway exit.

FIG. 6A shows a 3D map generated according to one embodiment of the present invention. The map is generated when a GPS-equipped vehicle approaches a highway exit. On the map, a flow arrow 612 directs the driver to an intended direction, and the distant road sign 610, which gives the road information regarding the intended direction, is enlarged to a readable size such that the driver knows exactly where he is heading. The road signs 610 may be included in the map object attribute table. In one embodiment, a driver may select which distant road sign to enlarge through the user interface in the GPS.

Figure 6B:
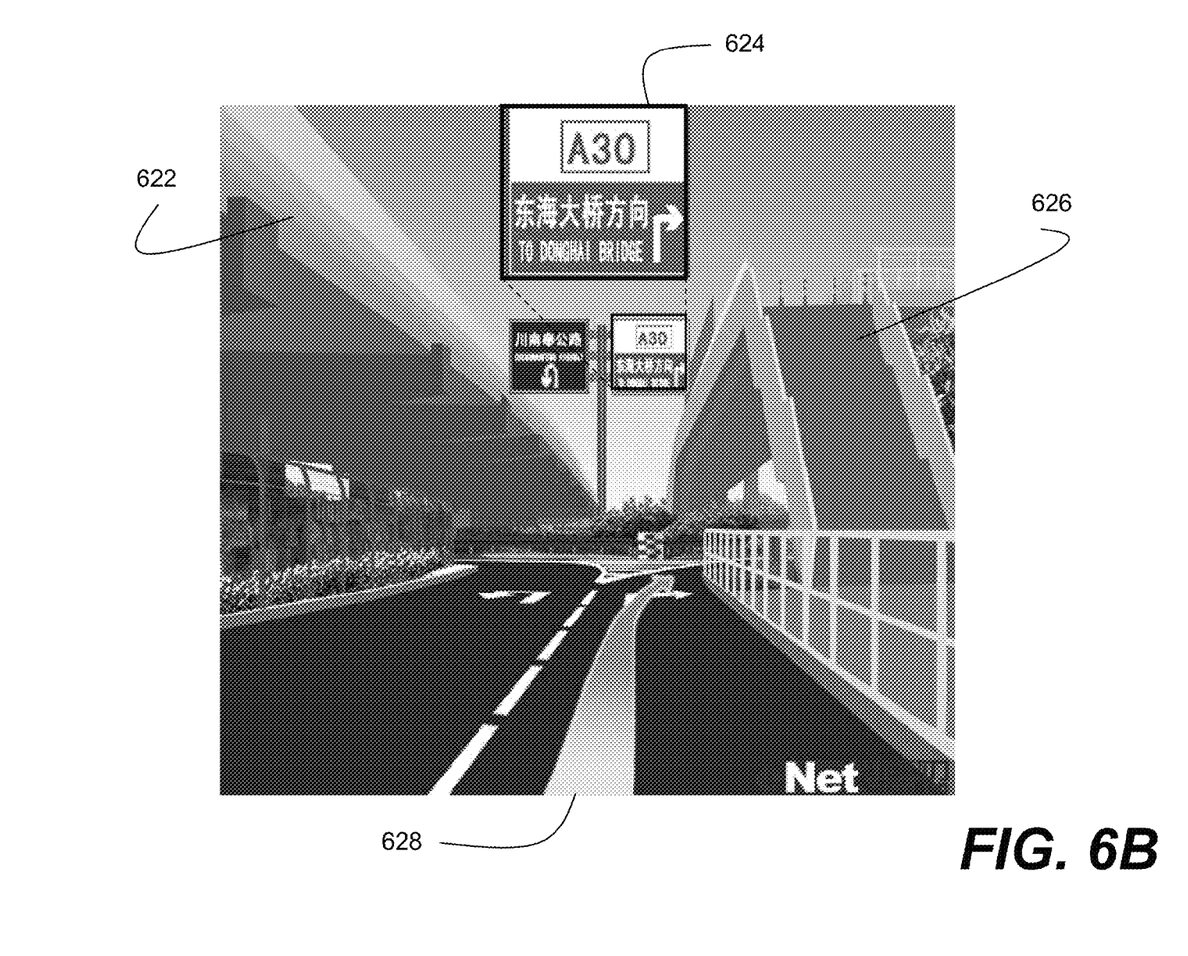
FIG. 6B shows another exemplary implementation of one embodiment of the present invention to generate a 3D map for an area with complex surroundings and roadways.

FIG. 6B shows another 3D map according to an implementation of the present invention. In a congested and complex traffic area, such as the one shown in FIG. 6B, where an elevated highway 622 is on the left and a walkway overpass 626 is on the left of a road, a traditional 2D map may not give the driver a clear view of where the road leads to. As an implementation of the present invention, a 3D map including the map objects 622 and 626, a flow arrow 628 indicating the intended driving direction along with an enlarge road sign 624 showing what area location the driver is heading are displayed on the map. Some or all of the necessary objects in the map may be generated from a map object attribute table enclosed in the GPS device.

The following description is about a process or a method of controlling color effects of an image or images for display.

Skin Color Change

Color Effect:

Color effect is a function F( ) that transforms a pixel color to another color:

F: (R,G,B)→(R,G,B)

Some color effects are expressed in HSL (Hue, Saturation, Lightness) color space:

F: (H,S,L)→(H,S,L)

In order to use the effect described in HSL color space, one needs first to convert the (R,G,B) color coordinates to (H,S,L) color coordinates, then apply the effect and convert back the color to (R,G,B) coordinates:

(R,G,B)→(H,S,L)—color effect→(H2,S2,L2)→(R2,G2,B2)

For example, changing any color to green can be done in the following way:

(R,G,B)→(H,S,L)→(GreenHue,S,L)→(R2,G2,B2)

So in one embodiment, the original hue is replaced with a green hue while the original saturation and lightness are retained. For display, the altered color is converted back to the RGB color space. The types of effects in use, are not limited only to pixel by pixel (single color) effects, but can be more complicated—like blurring and etc.

User Interface

With this approach, if a user interface is composed of a set of bitmaps, a color effect may be applied on every single pixel of the bitmaps and the result will be a user interface having a different color effect. It is also likely to apply different effects on different bitmaps, or no effect at all on certain bitmaps. This will give more flexibility in changing the color (appearance) of the user interface. These simple color-changing effects seem to be of most use. But of course other types of effects can be used.

Palette Approach

In the old days, a user interface was composed of bitmaps sharing a palette that can be changed dynamically and thus can affect the color of the user interface. But this limits the number of colors and also the possible palettes most likely were predefined. The present invention does not require such palettes.

Map Color Change

The idea is to have a small picture of sample map, containing all the map features (roads, natural objects) and the user can change the colors on the map and the navigation will use the colors from this map for the colors of the real map.

Junction View

Normally, to display a night mode junction view, one needs a separate set of junction view pictures. According to one embodiment of the present invention, a junction view in a map is modified by replacing each of the individual features with a single color uniquely identifying the feature. For example, wherever on the original picture was the sky, we replace it with a uniform blue color. Wherever on the picture was a grass, we replace it with a uniform green color. Note that originally the sky or the grass can be drawn using many different colors and shades. Since we have a new image with all the features marked with different unique colors, we draw any types of sky or any grass we want. According to one embodiment, a module is configured to replace the pixels of the corresponding feature with the pixels of a picture (or motion pictures) of sky, or grass, etc. This gives us an ability to change a junction view look based on time, weather, location, etc. And also saves memory space, instead of having every junction view drawn in many different ways, we have only one picture of the junction view.

3D Location Based Landscape View

Based on a specific time, a type of weather, a location we can change the sky and ground in a 3D view, with real or artistic panorama image or animated images, to beautify the view.

In one embodiment, instead of showing an arrow representing a vehicle going along a road, a car icon is used. The car icon may change to show lights on for night view, or may have a blinking light (left or right) based on the direction of a turn. When a driver turns on a turning light for getting ready for turn, the car icon is shown to have a blinking light for corresponding direction. In a dark environment, the car icon is shown to have headlights on.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. A method for displaying a map on a GPS receiver, the method comprising:
   displaying the map in accordance with a location determined by the GPS receiver, wherein the map shows a route on which the GPS receiver is indicated moving along;
   superimposing images representing objects onto the map, wherein the objects resembles structures or settings along the route, the images are superimposed along the route to create a 3D impression around the location, wherein the structures or settings include one or more of landmarks, signs, significant buildings, and exit designs, a perspective of the structures or settings changes in accordance with a direction the GPS receiver is moving;
   changing the images with different color effects in reference to an input from at least one source detecting weather conditions around the location at a specific time of a day that the map is to be displayed on the GPS receiver, making the map resembling an electronically generated map with a certain level of realism in accordance with surrounding of the location of the GPS at the time of the day, wherein the color effects are in respective tones pertaining to different times of the day, and the at least one source includes a raining sensor, the map is shown to include a raining effect when raining happens.

2. The method as recited in claim 1, wherein the objects are from a map object attribute table listing a plurality of land structures, each of the land structures being labeled with a predefined color corresponding to a time of a day the each of the structures is used in the map.

3. The method as recited in claim 2, wherein the changing of the images with different color effects comprising:
   receiving signals from one or more sensors; and
   determining what color components of the predefined color to alter in reference with the signals.

4. The method as recited in claim 1, wherein the GPS receiver is installed in a vehicle.

5. The method as recited in claim 4, wherein the map is not changed relatively while the images being imposed change as the structures or settings change.

6. The method as recited in claim 5, wherein an icon of the vehicle in the map shows that a pair of headlights is on when the vehicle is supposed to turn on its headlights.

7. The method as recited in claim 1, wherein the raining sensor installed in a vehicle equipped with the GPS receiver, the map is shown to include a raining effect.

8. The method as recited in claim 1, wherein the GPS receiver is coupled to a clock, the map is shown to include an effect changing with the clock.

9. A GPS receiver comprising:
   a memory space for storing code
   a micro-controller, coupled to the memory space, executing the code to perform operations of:
      displaying the map in accordance with a location determined by the GPS device, wherein the map shows a route on which the GPS receiver is indicated moving along;
      superimposing images representing objects onto the map, wherein the objects resembles structures or settings along the route, the images are superimposed along the route to create a 3D impression around the location, wherein the structures or settings include one or more of landmarks, signs, significant buildings, and exit designs, a perspective of the structures or settings changes in accordance with a direction the GPS receiver is moving;
      changing the images with different color effects in reference to an input from at least a source detecting weather conditions around the location at a specific time of a day that the map is to be displayed on the GPS device, making the map resembling an electronically generated map with a certain level of realism in accordance with surrounding of the location of the GPS at the time of the day, wherein the color effects are in respective tones pertaining to different times of the day, and the at least one source includes a raining sensor, the map is shown to include a raining effect when raining happens.

10. The GPS device as recited in claim 9, wherein the memory space further includes a map object attribute table listing a plurality of land structures, each of the land structures being labeled with a predefined color corresponding to a time of a day the each of the structures is used in the map.

11. The GPS device as recited in claim 9, wherein the GPS receiver is installed in a vehicle.

12. The GPS device as recited in claim 9, wherein the map is not changed relatively while the images being imposed change as the structures or settings change.

13. The GPS device as recited in claim 12, wherein an icon of the vehicle in the map shows that a pair of headlights is on when the vehicle is supposed to turn on its headlights.

14. The GPS device as recited in claim 9, wherein the raining sensor installed in a vehicle equipped with the GPS device, the map is shown to include a raining effect.

15. The GPS device as recited in claim 9, wherein the GPS device is coupled to a clock, the map is shown to include an effect changing with the clock.

16. The GPS device as recited in claim 9, wherein the at least source is a remote server providing weather information about the location.

17. The GPS device as recited in claim 9, wherein the at least source is a plurality of onboard sensors in a vehicle.

18. The GPS device as recited in claim 17, wherein the onboard sensors include one or more of a light detector, a temperature sensor, a humidity sensor and a clock.

* * * * *